(12) United States Patent
Lim et al.

(10) Patent No.: US 10,419,193 B2
(45) Date of Patent: Sep. 17, 2019

(54) DEVICE, SYSTEM, AND METHOD FOR ADAPTIVELY UTILIZING DATA EXCHANGE OPERATIONS

(71) Applicant: APPLE INC., Cupertino, CA (US)

(72) Inventors: Junsung Lim, Santa Clara, CA (US); Zhu Ji, San Jose, CA (US); Jia Tang, San Jose, CA (US); Johnson O. Sebeni, Fremont, CA (US)

(73) Assignee: Apple Inc., Cupertino, CA (US)

( * ) Notice: Subject to any disclaimer, the term of this patent is extended or adjusted under 35 U.S.C. 154(b) by 112 days.

(21) Appl. No.: 15/812,291

(22) Filed: Nov. 14, 2017

(65) Prior Publication Data

US 2018/0139028 A1 May 17, 2018

Related U.S. Application Data

(60) Provisional application No. 62/421,565, filed on Nov. 14, 2016.

(51) Int. Cl.
*H04L 5/00* (2006.01)
*H04L 1/18* (2006.01)
*H04W 72/04* (2009.01)

(52) U.S. Cl.
CPC .......... *H04L 5/0055* (2013.01); *H04L 1/1816* (2013.01); *H04L 1/1819* (2013.01); *H04L 1/1829* (2013.01); *H04L 1/1887* (2013.01); *H04L 5/0053* (2013.01); *H04W 72/042* (2013.01)

(58) Field of Classification Search
CPC .... H04L 5/0055; H04L 1/1829; H04L 1/1887
See application file for complete search history.

(56) References Cited

U.S. PATENT DOCUMENTS

| | | | |
|---|---|---|---|
| 2010/0098006 A1* | 4/2010 | Golitschek Edler Von Elbwart | H04L 1/1861 370/329 |
| 2013/0068318 A1* | 3/2013 | Kliskey | B23P 6/00 137/315.01 |
| 2013/0343273 A1* | 12/2013 | Barbieri | H04L 1/1822 370/328 |
| 2016/0337931 A1* | 11/2016 | Wang | H04W 4/70 |
| 2017/0374638 A1* | 12/2017 | Han | H04J 11/00 |
| 2018/0220394 A1* | 8/2018 | Bontu | H04W 52/0219 |

* cited by examiner

*Primary Examiner* — Brian S Roberts
*Assistant Examiner* — Abusayeed M Haque
(74) *Attorney, Agent, or Firm* — Fay Kaplun & Marcin, LLP (57) ABSTRACT

A method performed by a user equipment that includes receiving a redundancy version (RV) of control information during a transmission time interval (TTI) from a network to which the user equipment has established a connection, wherein the control information comprises a plurality of RVs, determining a first value corresponding to the TTI, determining a second value based on a connectivity parameter measurement of the connection and determining whether to perform a decode operation on the RV based on a comparison of the first value and the second value.

20 Claims, 5 Drawing Sheets

DEVICE, SYSTEM, AND METHOD FOR ADAPTIVELY UTILIZING DATA EXCHANGE OPERATIONS

PRIORITY CLAIM/INCORPORATION BY REFERENCE

This application claims priority to U.S. Provisional Application 62/421,565 entitled "Device, System, and Method for Adaptively Utilizing Data Exchange Operations," filed on Nov. 14, 2016, the entirety of which is incorporated herein by reference.

BACKGROUND INFORMATION

A user equipment (UE) may be configured to establish a connection to at least one of a plurality of different networks or types of networks to perform a variety of different functionalities via the network connection. For example, the UE may communicate with another UE through the network connection. For example, the communication may be a Voice over Internet Protocol (IP) (VoIP) call. Accordingly, the UE may register with an IP Multimedia Subsystem (IMS) for the VoIP functionality to be performed.

When the UE has established the connection to the network via an association operation with a base station of the network, the base station may transmit control information to, for example, define the manner in which data is to be exchanged between the UE and the network. The base station may transmit the control information using a manner that increases the probability that the UE will receive the control information. For example, since the base station is connected to an uninterruptable power supply, the control information may be transmitted with a highest available power. However, the connection of the UE to the network or any number of other reasons may prevent the UE from receiving the control information. Even if the UE does not receive the control information, the base station may still continue to operate under the assumption that the control information was received by the UE.

SUMMARY

In some exemplary embodiments, a method is performed by a user equipment. The method includes receiving a redundancy version (RV) of control information during a transmission time interval (TTI) from a network to which the user equipment has established a connection, wherein the control information comprises a plurality of RVs, determining a first value corresponding to the TTI, determining a second value based on a connectivity parameter measurement of the connection and determining whether to perform a decode operation on the RV based on a comparison of the first value and the second value.

In some additional exemplary embodiments a user equipment is provided that includes a processor. The processor is configured to receive a redundancy version (RV) of control information during a transmission time interval (TTI) from a network to which the user equipment has established a connection, wherein the control information comprises a plurality of RVs, determine a first value corresponding to the TTI, determine a second value based on a connectivity parameter measurement of the connection and determine whether to perform a decode operation on the RV based on a comparison of the first value and the second value.

In still further exemplary embodiments, a further method is performed by a user equipment. The method includes receiving a redundancy version (RV) of control information from a network to which the user equipment has established a connection, wherein the control information comprises a plurality of RVs, determining a confidence level of successfully performing a decode operation on the RV, determining whether the confidence level is less than a threshold value and when the confidence level is greater than or equal to the threshold value, performing the decode operation on the RV.

DETAILED DESCRIPTION

The exemplary embodiments may be further understood with reference to the following description and the related appended drawings, wherein like elements are provided with the same reference numerals. The exemplary embodiments are related to a device, system, and method for adaptively utilizing data exchange operations. Specifically, a user equipment (UE) may be connected to a network (e.g., a Long Term Evolution (LTE) network) in which a base station of the network (e.g., an evolved Node B (eNB)) transmits control information with the UE. When the base station of the network utilizes a repetition procedure in transmitting the control information, the exemplary embodiments provide a mechanism in which the UE may conserve power when decoding the control information.

Initially, it is noted that the exemplary embodiments are described with regard to the network being a LTE network and the base station of the network being an eNB. However, it should be noted that the use of the LTE network and the eNB is only exemplary. Those skilled in the art will understand that the connection of the UE may be to any network that exchanges control information using a repetition procedure via any type of base station or network component configured with this functionality. As will also be described in detail below, the exemplary embodiments may be modified for other types of data exchanges with the network that utilize the repetition procedure or a variant thereof.

When the UE has established a connection with the LTE network via the eNB, the eNB may transmit control information or other types of data. For example, the eNB may include scheduling information for data exchanges via a physical downlink control channel (PDCCH) or a physical downlink shared channel (PDSCH). From the perspective of the eNB, the priority in transmitting the control information is to maximize the probability that the UE will receive the control information. That is, the eNB does not prioritize power consumption in the transmission of control information to UEs. Those skilled in the art will understand that when compared to a mobile device such as the UE, the eNB has a limitless power supply. Accordingly, in one manner of transmitting the control information, the eNB may transmit the control information with a signal utilizing a maximum power that maximizes the probability of reaching the UE. This manner of transmitting the control information relies upon an assumption that the UE will receive the control information. However, due to any of a variety of factors, the UE may not receive the control information even with the eNB using a maximum power in transmitting the control information.

To accommodate the increase in devices, the expansion of the Internet of Things (IoT), and providing an improved manner of ensuring that the UE receives the control information, the LTE network and the eNBs may also utilize a different manner of transmitting the control information. For example, with applications associated with the IoT, a different LTE chipset may be used such as with a Category M (Cat-M) UE. The eNB may therefore utilize a coverage extension (CE) using a repetition procedure. Specifically, in the LTE Release 13, a PDSCH repetition is included which is scheduled from Cat-M PDCCH (MPDCCH) to extend the coverage of the LTE network as devices and applications associated with the IoT may undergo more severe channel impairment due to radio frequency implementation limitations as well as being located in unfavorable areas. The CE may be utilized in a variety of different manners. For example, the CE may be using a CE Mode A in which a targeted improvement is performed using a limited number of repetitions in the repetition procedure. Specifically, the number of repetitions in the repetition procedure under CE Mode A may be up to 32 repetitions or a value less than 32 with base 2 (e.g., 16, 8, 4, etc.). In another example, the CE may be using a CE Mode B in which a largescale improvement is performed using a significantly larger number of repetitions in the repetition procedure. Specifically, the number of repetitions in the repetition procedure under CE Mode B may be upwards of 2,000 repetitions.

The repetition procedure performed by the eNB in transmitting the control information may utilize different redundancy versions (RVs). As those skilled in the art will understand, the RVs may be data packets representing the control information that are packaged in different versions. Thus, the various RVs may be received in different transmission time intervals (TTIs). The reception of multiple different RVs may provide a higher likelihood that the UE decodes the control information since a combination of received RVs may increase redundancies of desired information. The repetition of the same RV also provides a higher likelihood of succeeding in decoding the control information by combining two received signals. As those skilled in the art will understand, the advantages and disadvantages of these two types of repetition processes is dependent on various conditions. Under the CE Mode A, the RVs may be rotated. For example, with four different RVs, the rotation may be a cyclical rotation of the four RVs that repeats. Under the CE Mode B, the RVs may be defined as a block of four consecutive TTIs where a block of subframes contains the same RV information (e.g., a simple repetition without a RV change).

The above description of the CE using the repetition procedure is described from the perspective of the eNB. As noted above, the eNB has a limitless power supply and may perform operations with power concerns being a low priority. However, from the perspective of the UE, power usage has a much higher priority since, when not being charged, the UE has a limited power supply. Therefore, it is desirable to select operations to be performed on the UE as a balance between providing the functionalities and power usage in a most efficient manner.

Those skilled in the art will understand that, from the perspective of the UE, the CE using the repetition procedure utilizes a significant amount of power and may be extremely power expensive when a channel condition becomes severe. For example, at early repetitions under severe channel conditions, the UE will likely fail to decode the control information since the RVs may not be received correctly or fully. The UE may continue to fail to decode the control information until some meaningful combining gain is accumulated (e.g., after even further repetitions). Only when the UE has successfully decoded the control information may the repetition procedure be terminated early and/or deactivate any communication component.

Furthermore, the LTE standard requires that the UE utilize a turbo decode operation for each RV received in a TTI. A turbo decode operation utilizes turbo codes which provide a high performance forward error correction (FEC) code. Those skilled in the art will understand the excessive processing and power requirements of using turbo codes and turbo decode operations, particularly through repeated use. Thus, the UE may utilize the turbo decode operation in one of two ways. In a first manner, a turbo decode operation is performed at each TTI. However, such a procedure in performing the turbo decode operation repeatedly under highly erroneous conditions (e.g., severe channel condition) is extremely power expensive since the turbo decode operation is likely not to be terminated early. In a second manner, a turbo decode operation is performed only after the last TTI of the repetition procedure. However, such a procedure in performing the turbo decode operation a single time whether or not the UE is under highly erroneous conditions is still highly power consumptive since the UE must maintain the RF components operating to receive each RV in the TTIs that likely leads to redundant receptions and an overall more complex combination operation (unless the number of repetitions is perfectly assigned which is highly unlikely).

To maximize efficiency in utilizing the turbo decode operation for CE using the repetition procedure, the exemplary embodiments provide a first and second mechanism configured to bypass the turbo decode operation for a predetermined number of repetitions based on the connection condition of the UE to the network. The exemplary embodiments do not attempt to perform a turbo decode operation for a number of TTIs. The number of TTIs is based on a likelihood that the turbo decode operation will be successful for a most recently received TTI as combined with any previously received TTIs. As will be described in further detail below, the exemplary embodiments are configured to dynamically select the number of TTIs to skip turbo decode operations to optimize power consumption as well customize the number of TTIs for the UE. It is noted that the use of the repetition procedure is only exemplary. As will also be described in further detail below, the exemplary embodiments may be modified to be used with any procedure in which a repetition or retransmission is utilized (e.g., a hybrid automatic repeat request (HARQ) procedure).

Figure 1:
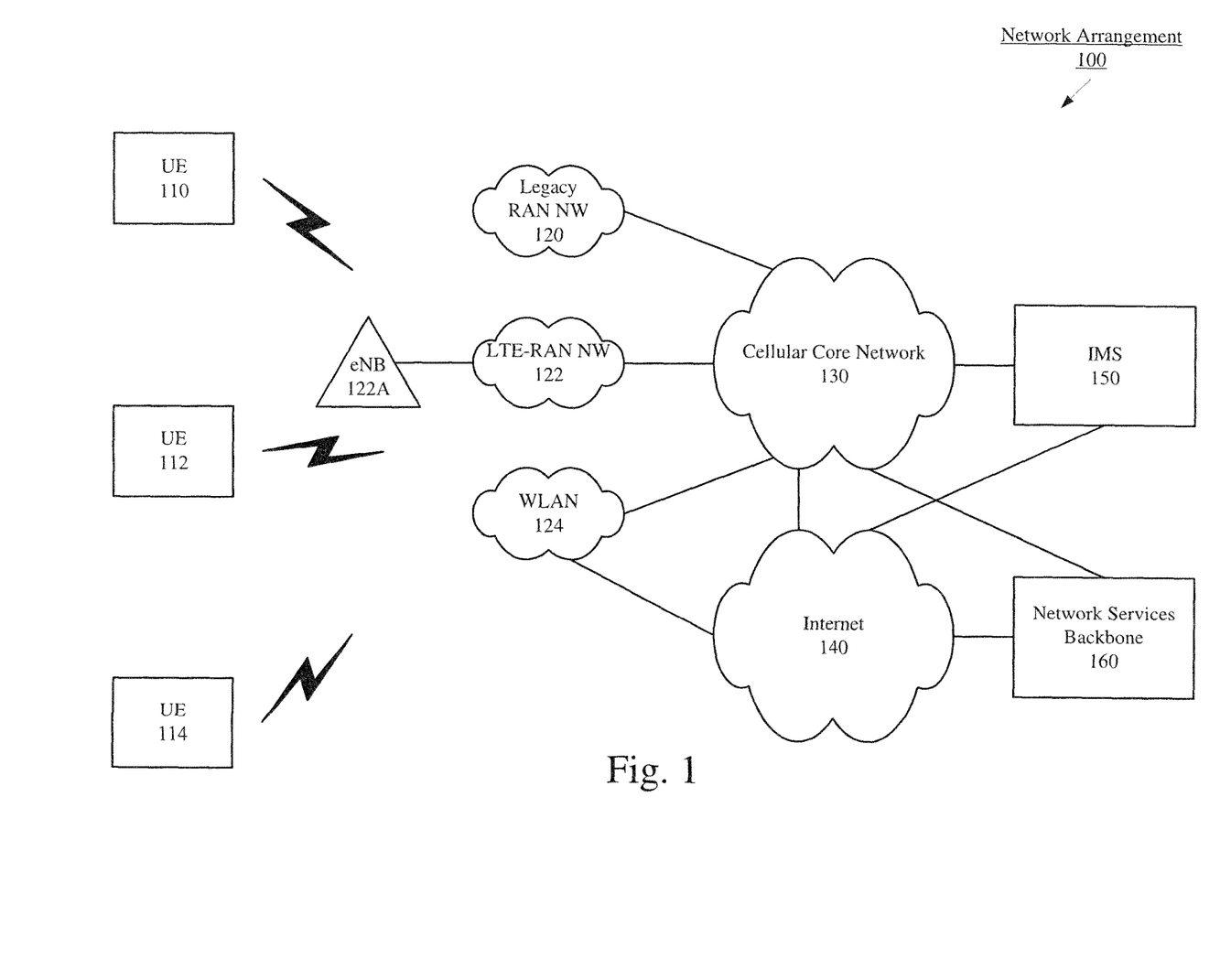
FIG. 1 shows a network arrangement according to various exemplary embodiments described herein.

FIG. 1 shows a network arrangement 100 according to various exemplary embodiments described herein. The network arrangement 100 includes UEs 110-114. Those skilled in the art will understand that the UEs 110-114 may be any type of electronic component that is configured to communicate via a network, e.g., mobile phones, tablet computers, desktop computers, smartphones, phablets, embedded devices, wearables, IoT devices, etc. It should also be understood that an actual network arrangement may include any number of UEs being used by any number of users and being associated with any number of these users where the user may be associated with one or more of the UEs. That is, the example of three (3) UEs 110-114 is only provided for illustrative purposes.

Each of the UEs 110-114 may be configured to communicate directly with one or more networks. In this example, the networks with which the UEs 110-114 may communicate are a legacy radio access network (RAN) 120, a LTE RAN (LTE-RAN) 122, and a wireless local area network (WLAN) 124. Each of the networks 120-124 is a wireless network with which the UEs 110-114 may communicate wirelessly. However, it should be understood that the UEs 110-114 may also communicate with other types of networks and may also communicate using a wired connection. With regards to the exemplary embodiments, the UEs 110-114 may establish a connection with the LTE-RAN 122 to, among other functionalities, perform VoLTE calls with other UEs. For example, the UEs 110-114 may have a LTE chipset and communicate with the LTE-RAN 122. As those skilled in the art will understand, the exchange of data in performing operations associated with the LTE-RAN 122 such as the VoLTE call may utilize control information from the LTE-RAN 122. Thus, the UEs 110-114 may receive the control information from the LTE-RAN 122 to coordinate the data exchange. Again, the use of three (3) networks is only exemplary and there may be any other number of networks with which the UEs 110-114 may communicate.

The legacy RAN 120 and the LTE-RAN 122 are portions of cellular networks that may be deployed by cellular providers (e.g., Verizon, AT&T, Sprint, T-Mobile, etc.). These networks 120 and 122 may include, for example, base client stations (Node Bs, eNodeBs, HeNBs, etc.) that are configured to send and receive traffic from UEs that are equipped with the appropriate cellular chip set including the control information. As noted above, the exemplary embodiments are described with regard to the LTE-RAN 122 but may be modified for use with the legacy RAN 120 when a repetition procedure is utilized. The WLAN 124 may include any type of wireless local area network (WiFi, Hot Spot, IEEE 802.11x networks, etc.). The exemplary embodiments may also be utilized with the WLAN 124 when a repetition procedure is utilized. Those skilled in the art will also understand that other types of networks may be deployed in the future (e.g., 5G networks) with which the UEs 110-114 may also communicate. The exemplary embodiments may also be utilized with these future deployed networks when a repetition procedure is utilized.

In addition to the networks 120-124, the network arrangement 100 also includes a cellular core network 130, the Internet 140, an IP Multimedia Subsystem (IMS) 150, and a network services backbone 160. The cellular core network 130 may be considered to be the interconnected set of components that manages the operation and traffic of the cellular network. The cellular core network 130 also manages the traffic that flows between the cellular network and the Internet 140. The IMS 150 may be generally described as an architecture for delivering multimedia services to the UEs 110-114 using the IP protocol. The IMS 150 may communicate with the cellular core network 130 and the Internet 140 to provide the multimedia services to the UEs 110-114. The network services backbone 160 is in communication either directly or indirectly with the Internet 140 and the cellular core network 130. The network services backbone 160 may be generally described as a set of components (e.g., servers, network storage arrangements, etc.) that implement a suite of services that may be used to extend the functionalities of the UEs 110-114 in communication with the various networks. The network services backbone 160 may interact with the UEs 110-114 and/or the networks 120, 122, 124, 130, 140 to provide these extended functionalities.

The exemplary embodiments relate to the UEs 110-114 connecting to the LTE-RAN 122 via an evolved Node B (eNB) 122A. The eNB 122A may be configured to exchange data with the UEs 110-114 through scheduled data transmissions defined using control information. For example, the control information may be provided using a PDCCH and/or a PDCCH transmission at predefined times when the UEs 110-114 are configured to receive data. Initially, the UEs 110-114 may establish a connection to the LTE-RAN 122. Those skilled in the art will understand that any association procedure may be performed for the UEs 110-114 to connect to the LTE-RAN 122. For example, as discussed above, the LTE-RAN 122 may be associated with a particular cellular provider where the UE 110-114 and/or the user thereof has a contract and credential information (e.g., stored on a SIM card). Upon detecting the presence of the LTE-RAN 122, the UEs 110-114 may transmit the corresponding credential information to associate with the LTE-RAN 122. More specifically, the UEs 110-114 may associate with a specific access point (e.g., the eNB 122A of the LTE-RAN 122).

Those skilled in the art will understand that the control information may enable a synchronization of the UEs 110-114 with the eNB 122A. To properly be prepared for demodulating signals received from the eNB 122A and/or transmitting signals or data to the eNB 122A, the UE must be configured with proper settings. Specifically, properties related to the physical layer of the transceiver used to connect to the LTE-RAN 122 must be known. For example, the channel (e.g., band of frequencies) must be known for the incoming signal in order for it to be properly received. In another example, the wireless properties including timing parameters must be known for data packets to be properly transmitted. Therefore, control information including grant information, reference symbols, etc. may be received in a background operation during connection with the LTE-RAN 122. Thus, the control information has a pivotal role to enable the data exchange between the UEs 110-114 with the LTE-RAN 122. In view of this importance, the LTE-RAN 122 may utilize the CE procedure using the repetition procedure to increase the likelihood that the UEs 110-114 receive the control information.

It is noted that the UEs 110-114 and the LTE-RAN 122 may utilize any scheduling mechanism for the control information to be received. For example, the UEs 110-114 and the LTE-RAN 122 may be configured with a connected discontinuous reception (CDRX) protocol in which control information is allowed to be scheduled for reception by the UEs 110-114 from the eNB 122A. The exemplary embodiments may incorporate any type of scheduling mechanism for the control information to be received using the repetition procedure in which the control information and its RVs are transmitted in a TTI.

From the perspective of the LTE-RAN 122 and the eNB 122A, the repetition procedure may entail the RVs corresponding to the control information to be transmitted in a repetitive manner. As described above, when using the CE Mode A, the eNB 122A may determine the control information bound for the UE 110. The control information may be packaged into a plurality of different RVs such as four different versions. The eNB 122A may transmit a first RV, followed by a second RV, followed by a third RV, and then a fourth RV. This transmission cycle may repeat, for example, eight repetition cycles (so that a total of 32 repetition transmissions are performed). The exemplary embodiments relate to a mechanism performed by the UEs 110-114 to limit power consumption when the eNB 122A utilizes the repetition procedure. Accordingly, the exemplary embodiments will not alter the operations performed by the LTE-RAN 122 and the eNB 122A, which may remain as is defined by the LTE Specification.

Figure 2:
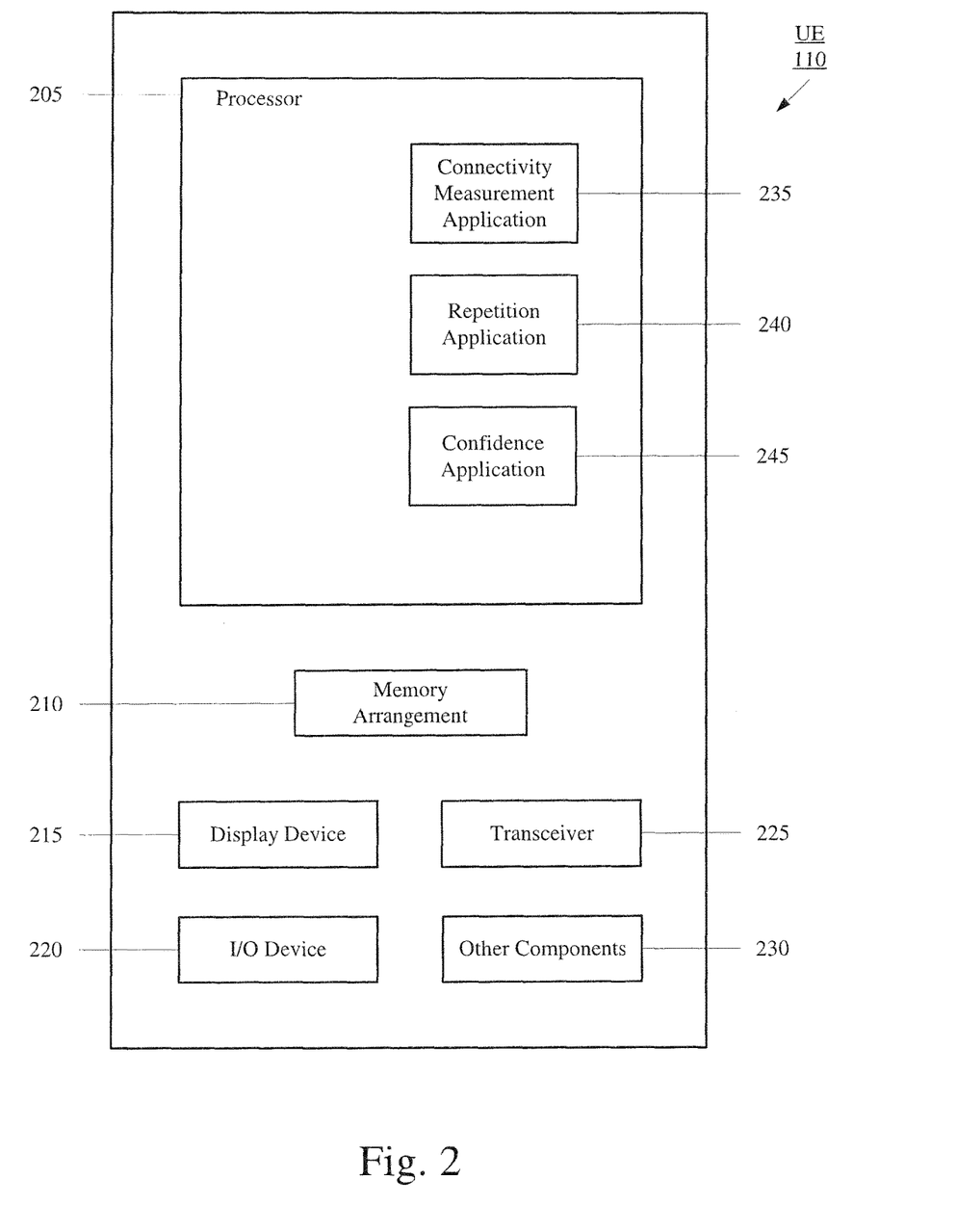
FIG. 2 shows a user equipment according to various exemplary embodiments described herein.

FIG. 2 shows the exemplary UE 110 of the network arrangement 100 of FIG. 1 according to various exemplary embodiments described herein. Specifically, the UE 110 is configured to execute a plurality of applications that perform functionalities to select a repetition operation to be performed based on a connection quality parameter. The repetition operations may include a first repetition operation in which control information is combined from RVs received in TTIs and a second repetition operation in which control information is combined from RVs received in TTIs and then having a turbo decode operation being performed on the combined data.

The UE 110 may represent any electronic device that is configured to perform wireless functionalities and may be representative of one or more of the UEs 110-114. For example, the UE 110 may be a portable device such as a smartphone, a tablet, a phablet, a laptop, a wearable, an IoT device, etc. In another example, the UE 110 may be a client stationary device such as a desktop terminal. The UE 110 may be configured to perform cellular and/or WiFi functionalities. The UE 110 may include a processor 205, a memory arrangement 210, a display device 215, an input/output (I/O) device 220, a transceiver 225, and other components 230. The other components 230 may include, for example, an audio input device, an audio output device, a battery that provides a limited power supply, a data acquisition device, ports to electrically connect the UE 110 to other electronic devices, etc.

The processor 205 may be configured to execute a plurality of applications of the UE 110. For example, the applications may include a VoLTE application that enables the UE 110 to perform a VoLTE call functionality. As noted above, to properly exchange data associated with the VoLTE application (e.g., outgoing voice data, incoming voice data, etc.), the UE 110 utilizes a schedule to transmit uplink data and receive downlink data as defined by the control information from the eNB 122A. In another example, the processor 205 may execute a connectivity measurement (CM) application 235. As will be described in further detail below, the CM application 235 may be utilized in conjunction with a first exemplary mechanism according to the exemplary embodiments. Using the first exemplary mechanism, the CM application 235 may be configured to perform measurements to assess a quality of a connection that the UE 110 has with the LTE-RAN 122 via the eNB 122A. In a further example, the processor 205 may execute a repetition application 240. As will be described in further detail below, the repetition application 240 may be configured to select which of the repetition operations associated with the repetition procedure to perform, perform the repetition operations, and customize the selection process. In yet another example, the processor 205 may execute a confidence application 245. As will be described in further detail below, the confidence application 245 may be utilized in conjunction with a second exemplary mechanism according to the exemplary embodiments. Using the second exemplary mechanism, the confidence application 245 may be configured to determine a confidence level that a decode operation will likely be successful for one or more TTIs that are combined. It is noted that the repetition application 240 may be utilized in both the first mechanism (with the CM application 235) and the second mechanism (with the confidence application 245).

It should be noted that the above noted applications each being an application (e.g., a program) executed by the processor 205 is only exemplary. The functionality associated with the applications may also be represented as a separate incorporated component of the UE 110 or may be a modular component coupled to the UE 110, e.g., an integrated circuit with or without firmware. For example, the integrated circuit may include input circuitry to receive signals and processing circuitry to process the signals and other information. In addition, in some UEs, the functionality described for the processor 205 is split among two processors, a baseband processor and an applications processor. The exemplary embodiments may be implemented in any of these or other configurations of a UE.

The memory 210 may be a hardware component configured to store data related to operations performed by the UE 110. As will be described in further detail below, the memory 210 may store a standard table or a customized table indicating a value for which to bypass a decode operation as a function of a connectivity measurement. The memory 210 may also store a confidence level threshold indicating a minimum confidence level that should be reached to bypass a decode operation based on whether the decode operation will be successful. The display device 215 may be a hardware component configured to show data to a user while the I/O device 220 may be a hardware component that enables the user to enter inputs. It should be noted that the display device 215 and the I/O device 220 may be separate components or integrated together such as a touchscreen.

The transceiver 225 may be a hardware component configured to exchange data with the eNB 122A. The transceiver 325 may enable communication with the LTE-RAN 122 or with other electronic devices directly or indirectly through the LTE-RAN 122 to which the UE 110 is connected. The transceiver 325 may operate on a variety of different frequencies or channels (e.g., set of consecutive frequencies). Thus, an antenna (not shown) coupled with the transceiver 225 may enable the transceiver 225 to operate on the LTE frequency band.

According to a first exemplary mechanism of the exemplary embodiments, the UE 110 may modify the manner in which a decode operation (e.g., a turbo decode operation based on turbo codes) is performed when RVs are being received in respective TTIs for control information from the eNB 122A. For example, when a first RV is received, the UE 110 may determine that the eNB 122A is utilizing the repetition procedure and track each TTI in which the RVs are being received. It is noted that the exemplary embodiments described herein relate to utilizing the turbo decode operation as the decode operation. However, the exemplary embodiments may be modified to be used with any type of decode operation. As those skilled in the art will understand, the repetition procedure may incorporate a combination operation in which all RVs that have been received up to a current point are combined and the combined data is attempted to be decoded. For example, a substantially similar operation as a hybrid automatic repeat request (HARQ) procedure may be performed. Specifically, the HARQ procedure and the RVs may include error correcting information such that the control information that may not be properly received in a first RV may be corrected with data from at least one second RV. As described above, the repetition application 240 may be configured to select which of the repetition operations associated with the repetition procedure to perform where the repetition operations include a first repetition operation (one or more respective data in TTIs corresponding to the control information is combined) and a second repetition operation (one or more respective data in TTIs corresponding to the control information is combined and further performing the decode operation). The selection of the repetition operation may be dynamic based on a number of TTIs and a measured connectivity parameter of the UE 110.

As described above, the memory 210 may store a table. The table may define a value (hereinafter referred as "NSkip") of TTIs in which the first repetition operation (combining) is to be performed. That is, the NSkip may indicate the number of TTIs when the decode operation is to be skipped. As described above, the NSkip may be a minimum number of TTIs that results in a probability that decoding the combined RVs will be successful (whereas even one less TTI will likely result in a failure). Thus, the table may indicate a number of TTIs for which the combining operation is to be performed, but the decode operation is to be skipped until a number of received TTIs is greater than the value of NSkip. The value of NSkip may be based on a connectivity parameter such as SNR. Thus, for a first SNR or a first range of SNRs, the NSkip may have a first value; for a second SNR or a second range of SNRs, the NSkip may have a second value; etc. In this manner, the NSkip value may be dynamically selected based on the current connectivity conditions of the UE 110. In a particular embodiment, when the connectivity conditions of the UE 110 are good, the NSkip may be minimized; when a first connectivity condition of the UE 110 is better than a second connectivity condition of the UE 110 (e.g., first SNR is greater than second SNR), the NSkip for the first connectivity condition may be lower than the Nskip for the second connectivity condition, etc. Accordingly, the table in the above example may be two-dimensional in that the table may include a set of rows of connectivity conditions and a set of columns of NSkip values. Thus, given a connectivity condition such as a SNR measurement, the table may be referenced to determine the NSkip to be used. It should be noted that the use of a table to store the Nskip values is only exemplary and any type of storage mechanism may be used.

In view of the above, a first operation performed by the UE 110 is to measure the connectivity parameter. As noted above, the CM application 235 may monitor one or more connectivity parameters that indicate a quality or condition of the connection that the UE 110 has with the LTE-RAN 122 via the eNB 122A. The CM application 235 may monitor, for example, a downlink signal to noise ratio (SNR) (e.g., a level of a desired signal to background noise for data blocks received by the UE 110), a block error rate (BLER) (e.g., a ratio of erroneous data blocks to a total number of data blocks received by the UE 110), a Doppler value (e.g., a change or ratio of a signal frequency from an originating signal frequency), a power headroom value (e.g., a transmission power remaining for the UE 110 to use in addition to the power currently being used for a transmission), etc. The description herein relates particularly to using the SNR. However, the exemplary embodiments may also be configured to monitor and measure the other noted connectivity parameters or other connectivity parameters. The exemplary embodiments may also be configured to utilize the SNR alone, the SNR with at least one other connectivity parameter, another connectivity parameter alone, or at least two other connectivity parameters. For example, the table may be multi-dimensional to incorporate a plurality of connectivity parameters that are used to determine the NSkip value.

Based on the measurement of the connectivity parameter by the CM application 235 and using the table stored in the memory 210, the repetition application 240 may determine whether the first or second repetition operation is to be performed by determining the NSkip value to be used and identifying the current TTI or the current repetition number (hereinafter referred to as "NRep"). Specifically, when the NRep is identified as being less than the NSkip, the repetition application 240 selects the first repetition operation in which only a combination operation is performed. When the NRep is identified as being greater than or equal to the NSkip, the repetition application 240 selects the second repetition operation in which a combination operation and a subsequent decoding operation is performed. For example, the decoding operation may correspond to a cyclical redundancy check (CRC) to determine whether the combined data from the RVs results in the correct control information.

Using the above mechanism of selecting the appropriate repetition operation, the repetition application 240 attempts to receive the control information from the eNB 122A. Since no decoding operation is performed until the TTI reaches the NSkip value, the repetition application 240 may gather and combine the RVs being received in the TTIs that are less than the NSkip. When the NRep reaches the NSkip, the repetition application 240 may attempt to decode the combined data. When the decode operation succeeds, the transceiver 225 may be deactivated since the control information has been successfully received. However, when the decode operation fails, the transceiver 225 remains active and the repetition application 240 receives the ensuing RV in the next TTI to again combine and attempt to decode. This process may continue with the second repetition operation until the control information has been decoded with a successful CRC.

As described above, the repetition application 240 may provide a further feature to customize the table of NSkip values. Initially, the table that is stored in the memory 210 may be a predetermined or standard table. The standard table may be based on experimental data collected by an administrator who determines the Nskip values for the measurements of the connectivity parameter. However, those skilled in the art will understand that each UE and its user may create different operating conditions that may affect the manner in which transmissions may be performed (e.g., interference issues). In another example, the UE may be static (in the same location for an extended period of time) or experiencing a rapid change in location which affects the manner in which transmissions may be performed. Accordingly, the standard table may be modified for the NSkip or include NSkip values based on further factors such as a speed that is being experienced by the UE.

In a first modification, the table stored in the memory 210 may be customized. The repetition application 240 may determine when the table is to be updated for customization. In a first example, the repetition application 240 may determine when a decoding operation was successfully performed. When the successful decoding operation is identified, the repetition application 240 may utilize the information in decoding the control information to customize the table. In a second example, the repetition application 240 may determine when a predetermined number of decoding operations were successfully performed. Thus, the repetition application 240 may utilize the information in decoding the various control information to customize the table. In a third example, the repetition application 240 may determine whether a predetermined time period has elapsed to customize the table.

The repetition application 240 may customize the table by adjusting the NSkip values. For example, a total number of TTIs in which respective RVs are received to successfully decode the control information may be represented as NPass. A further variable NCheck may be defined as a difference between NPass and NSkip. Thus, NPass may represent the number of TTIs in which the decode operation was used to successfully decode the control information. The repetition application 240 may utilize a down threshold and an up threshold. For example, the down threshold may be a number of TTIs that qualifies the NSkip to be decreased whereas the up threshold may be a number of TTIs that qualifies the NSkip to be increased. Therefore, if the NCheck is less than the down threshold, the repetition application 240 may decrease the NSkip values in the table. For example, the NSkip across the entire table may be decreased by a set value (e.g., −1). If the NCheck is greater than the up threshold, the repetition application 240 may increase the NSkip values in the table. For example, the NSkip across the entire table may be increased by a set value (e.g., +1). It is noted that the NSkip values in the table may be increased/decreased in a dynamic manner. For example, NSkip values having extreme connectivity parameter measurements may have a more aggressive change whereas connectivity parameter measurements in between the extremes may have a more conservative change.

It is noted that the mechanism associated with the down threshold may be constructively represented in a different form. Specifically, any positive NCheck value means that at least one more TTI was required than what was identified in the NSkip. Furthermore, the NSkip value represents the number of TTIs that the first repetition operation is to be performed prior to the second repetition operation being performed (which includes the decode operation). Thus, the Ncheck cannot have a negative value since no decoding is performed prior to the NSkip. Accordingly, the down threshold may be set to 0 as the lowest value of NCheck is 0. The different form used with the down threshold is whether the NCheck maintains a value of 0 for a predetermined number of successful decode operations. If the repetition application 240 determines that the NCheck is 0 for the predetermined number, the NSkip value may be decreased. It is noted that the repetition application 240 may not be required to determine that the NCheck is 0 for a consecutive number of successful decode operations. In another exemplary embodiment, the repetition application 240 may determine whether the NSkip is 0 for at least a predetermined percentage of successful decode operations.

In a second modification, the table stored in the memory 210 may be temporarily updated based on a condition being experienced by the UE 110. For example, the UE 110 may be moving at a high rate of speed, be within a building/tunnel where the UE 110 has a poor reception for a temporary period of time, be significantly near a cellular antenna where the UE 110 has an optimal reception for a temporary period of time, etc. When the repetition application 240 determines a particular condition that affects the connection of the UE 110 in a temporary manner, the repetition application 240 may also temporarily modify the NSkips in the table. For example, during poor conditions, the table currently being used may have at least one of the NSkip values increased by a predetermined amount. In another example, during optimal conditions, the table currently being used may have at least one of the NSkip values decreased by a predetermined amount. However, when the condition expires, the repetition application 240 may return using the table prior to the temporary customization.

The exemplary embodiments enable the repetition procedure used by the eNB 122A to be used by the UE 110 in a more power efficient manner. Specifically, the UE 110 may assume that RVs received in TTIs from 1 until the NSkip value (as defined in the table based on a measurement of the connectivity parameter being experienced by the UE 110) will not result in a successful decode operation. Thus, the UE 110 may perform only a combining operation and delay any power consuming decode operation (that will likely fail) from being performed. When the RV in a TTI that is greater than the NSkip value is received, the UE 110 may begin to perform the decode operation with a higher probability of success. In this manner, the UE 110 may conserve power by eliminating a need to perform decode operations that will likely fail.

The exemplary embodiments are described above with regard to the CE using the repetition procedure. However, as noted above, the CE using the repetition procedure is only exemplary. The mechanism according to the exemplary embodiments may also be utilized for any transmission procedure in which some form of repetition is used. For example, a HARQ procedure in which one or more transmissions are received to decode a data packet may also utilize the mechanism according to the exemplary embodiments. Specifically, a conventional HARQ procedure may attempt to decode each transmission (or combination thereof) and transmit an ACK or a NACK based on whether the CRC passes. However, by applying the mechanism according to the exemplary embodiments, the UE 110 may select to transmit a NACK until a number of transmissions reaches the NSkip value. The UE 110 may also bypass any decoding operation and omit the CRC. Thereafter, when the transmissions surpass the NSkip value, the UE 110 may perform the decoding operation with a higher likelihood of success to decode the data packet and transmit an ACK.

Figure 3:
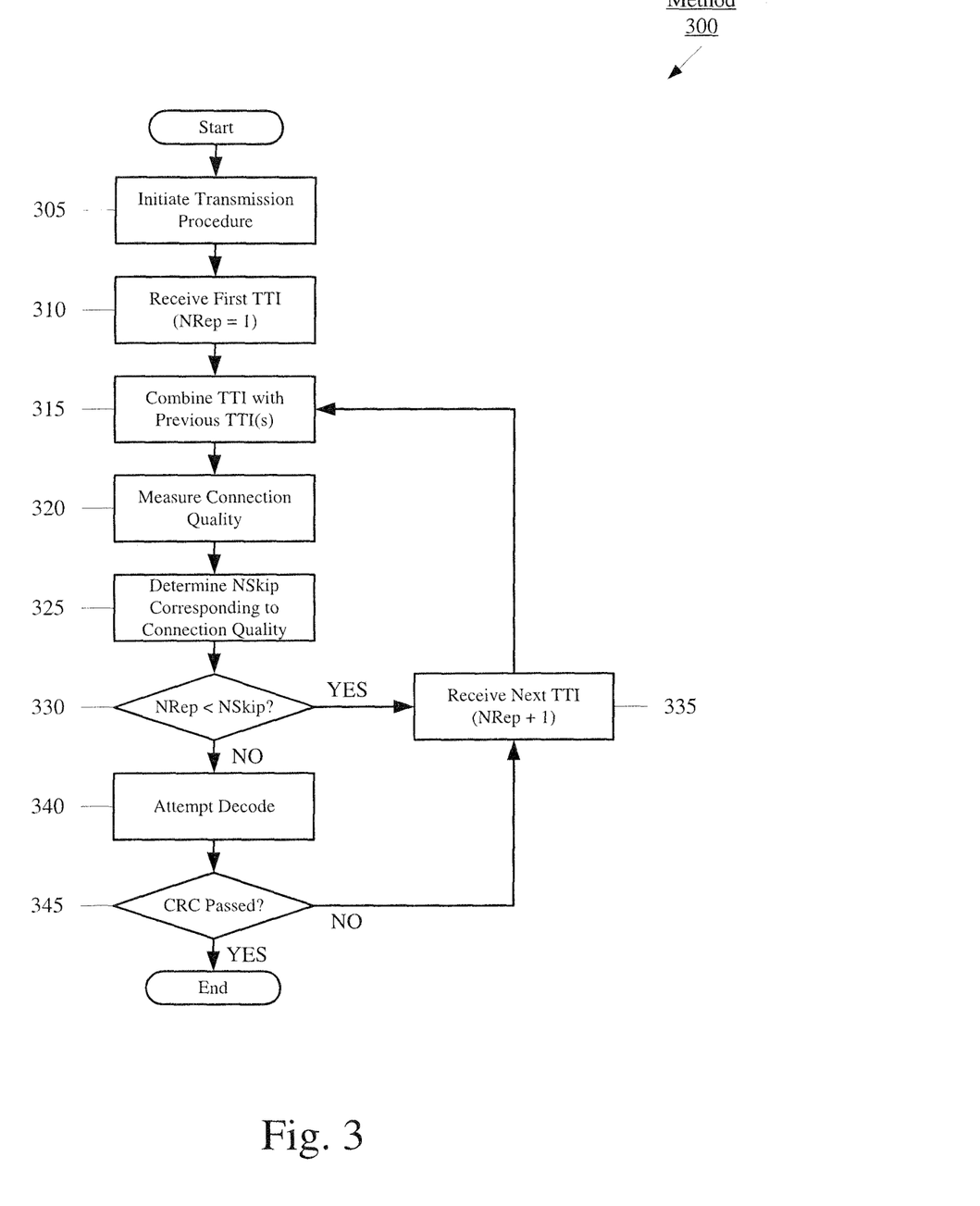
FIG. 3 shows a first method for dynamically utilizing repetition operations according to various exemplary embodiments described herein.

FIG. 3 shows a method 300 for dynamically utilizing repetition operations according to various exemplary embodiments described herein. The method 300 relates to how the UE 110 determines whether the first repetition operation or the second repetition operation is to be used. The method 300 is directed to the first mechanism of the exemplary embodiments described above. The method 300 will be described with regard to the network arrangement 100 of FIG. 1 and the UE 110 of FIG. 2.

In 305, the UE 110 initiates a transmission procedure. In step 310, the UE 110 receive a RV in a TTI. For example, the eNB 122A may transmit a first RV in a first TTI indicating that control information is being transmitted using the repetition procedure. As the first RV in the first TTI, the NRep may be 1. In 315, the UE 110 combines the received TTI with any previously received TTI. Since this iteration relates to the first TTI (NRep=1), the RV in the first TTI represents the entire combination.

In 320, the UE 110 measures a connection quality. Specifically, the UE 110 via the CM application 235 may measure a connectivity parameter such as a SNR. In 325, the UE 110 determines the NSkip corresponding to the connection quality as identified in the table stored in the memory 210. Again, the NSkip may represent the number of TTIs in which the first repetition operation is to be performed.

In 330, the UE 110 determines whether the NRep is less than the NSkip value. In this iteration, the NRep=1. If the NRep is less than the NSkip value, the UE 110 continues to 335. In 335, the UE 110 receives the next TTI (one greater than the current NRep, which in this iteration is NRep 1=2). Subsequently, the UE 110 returns to 315. Since no decoding operation is being performed (since the first repetition operation is being selected as NRep is less than NSkip), the UE 110 repeats 315-335 until the NRep is at least the NSkip value. In this manner, each TTI that is received until the NRep is at least the NSkip value is combined (at 315).

Returning to 330, when the NRep is at least the NSkip value, the UE 110 continues to 340. In 340, the UE 110 attempts to decode the combined data from all the TTIs to the current moment. In 345, the UE 110 determines whether a CRC (e.g., a decode operation) has passed. If the CRC fails, the UE 110 may receive the next TTI in 335 and then repeat 315-340. That is, the second repetition operation may be used hereafter (assuming the NSkip value remains constant). However, if the CRC passes, the control information is properly received and the transceiver 225 may be deactivated.

It is noted that the NSkip value may change with each iteration. For example, when the connection quality is measured at a subsequent time, the connection quality may improve or deteriorate. When the connection quality improves, the NSkip value may potentially decrease (as indicated in the table). When the connection quality deteriorates, the NSkip value may potentially increase (as indicated in the table). Thus, in an exemplary scenario, it may be possible to attempt the decode operation since the NRep was at least the NSkip value during one iteration. However, at a subsequent time, the first repetition operation may again be used (and the decode operation bypassed) if the connection quality deteriorates and the NSkip is increased to an amount that the NRep is less than the new NSkip.

As described above, the first mechanism of the exemplary embodiments may also be modified for use with the HARQ procedure. Thus, the method 300 may be modified accordingly. For example, the combination operation in 315 may be the HARQ combination operation using a log-likelihood ratio (LLR) combiner functionality. In another example, unlike the repetition operation for CE, the HARQ procedure uses a response from the UE 110 to provide a retransmission if needed. Thus, if the CRC fails after 345, the UE 110 may transmit a NACK prior to returning to 335. If the CRC passes after 345, the UE 110 may transmit an ACK.

Figure 4:
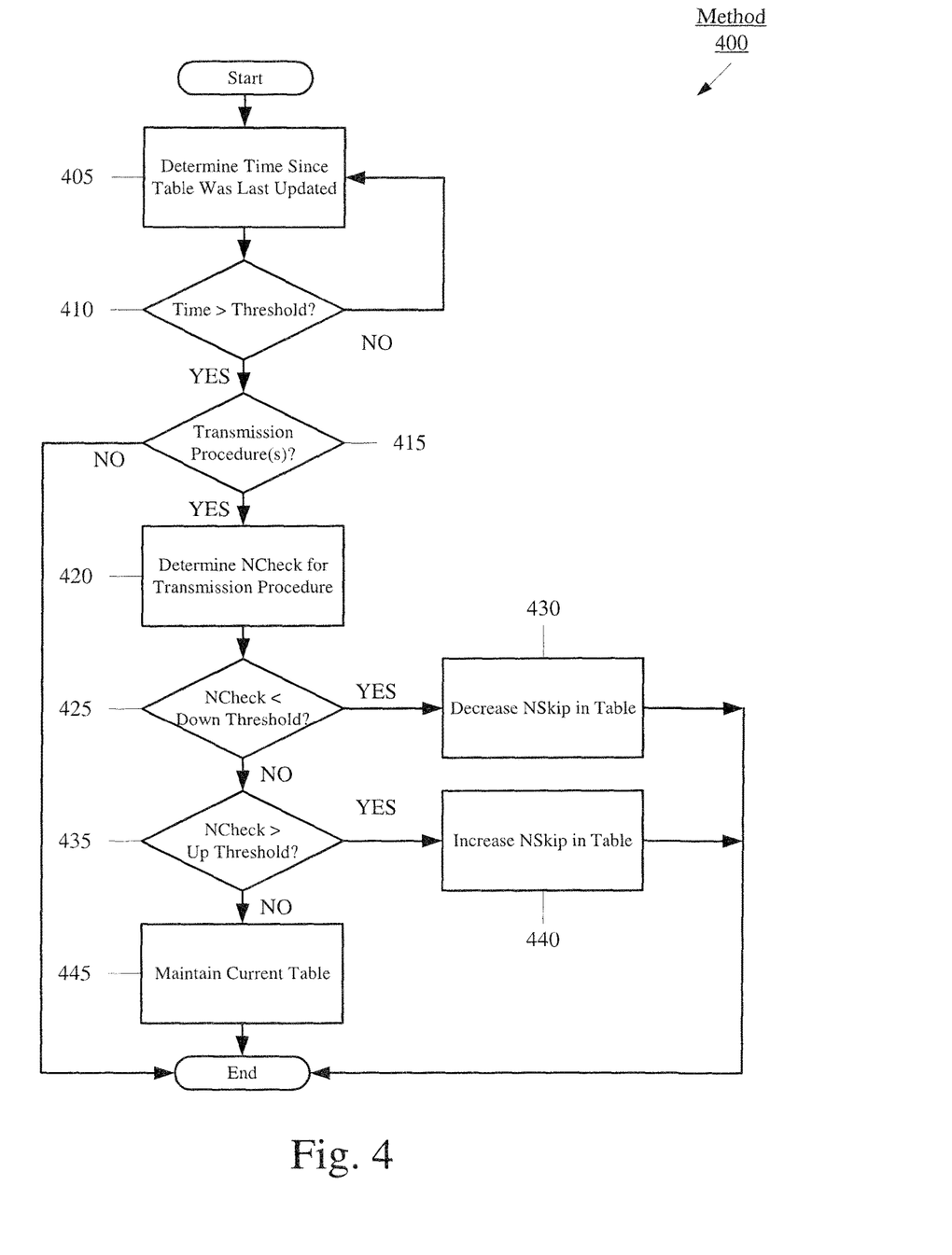
FIG. 4 shows a method for determining a threshold used in the method of FIG. 3 according to various exemplary embodiments described herein.

FIG. 4 shows a method 400 for determining a threshold used in the method 300 of FIG. 3 according to various exemplary embodiments described herein. The method 400 relates to how the UE 110 customizes the table stored in the memory 210. Specifically, the method 400 is directed to modifying the NSkip values in the table. Accordingly, the method 400 is also directed to the first mechanism of the exemplary embodiments. The method 400 also relates to modifying the table based on successful decode operations. The method 400 will be described with regard to the network arrangement 100 of FIG. 1 and the UE 110 of FIG. 2.

In 405, the UE 110 determines a time since the table was last updated. In 410, the UE 110 determines whether the time is greater than a time threshold. If the time is less than the time threshold, the UE 110 returns to 405. However, if the time is greater than the time threshold, the UE 110 continues to 415. It should again be noted that the UE 110 performing the method 400 based on a timer is only exemplary. As described above, other examples for triggering a review of the Nskip values may include the UE 110 utilizing the method 400 each time a successful decode operation is performed, for a predetermined number of successful decode operations being performed, etc.

In 415, the UE 110 determines whether there have been any successful transmission procedures performed. If no transmission procedures were performed, the UE 110 has no information to customize the table. Thus, the method 400 ends. However, if at least one transmission procedure was performed during the time, the UE 110 continues to 420.

In 420, the UE 110 determines the NCheck for a selected transmission procedure. As described above, the NCheck may be a difference between the NPass and the NSkip. Thus, the NCheck may be a number of TTIs beyond the NSkip that were used to successfully perform the decode operation. In 425, the UE 110 determines whether the NCheck is less than the down threshold. If the NCheck is less than the down threshold, the UE 110 continues to 430 where the NSkip in the table (all NSkips or select NSkips) are decreased by a static or dynamic amount. It is again noted that with the down threshold, the UE 110 may determine whether one or more or a percentage of successful decode operations have a NCheck of 0. For example, if the UE 110 determines that the successful decode operations were performed for three consecutive times with each iteration having a NCheck of 0, the NSkips in the table may be decreased by 1. In another example, if the UE 110 determines that the successful decode operations were performed at least 75% of the time, the NSkips in the table may be decreased by 1.

If the NCheck is greater than the down threshold, the UE 110 continues to 435. In 435, the UE 110 determines whether the NCheck is greater than the up threshold. If the NCheck is greater than the up threshold, the UE 110 continues to 440 where the NSkip in the table (all NSkips or select NSkips) are increased by a static or dynamic amount. For example, the NSkips in the entire table may be increased by 1. In another example, the NSkips for extreme connectivity parameter measurements (e.g., SNRs under a first threshold) may be increased by 3, NSkips for moderate connectivity parameter measurements (e.g., SNRs over the first threshold but under a second threshold) may be increased by 2, and NSkips for other connectivity parameter measurements (e.g., SNRs over the second threshold) may be increased by 1. However, if the NCheck is less than the up threshold, the UE 110 continues to 445 where the NSkip values in the current table are maintained.

It should again be noted that the method 400 relating only to information associated with successful decode operations is only exemplary. As described above, the UE 110 may also utilize other factors such as position, speed, temporary conditions, etc. to modify the table of NSkip values.

According to a second mechanism of the exemplary embodiments, the UE 110 may modify the manner in which a decode operation (e.g., a turbo decode operation based on turbo codes) is performed when RVs are being received and an analysis operation is performed for each TTI that the RV is being received from the eNB 122A. For example, when a first RV is received, the UE 110 may determine that the eNB 122A is utilizing the repetition procedure and perform the analysis operation for each TTI being received. It is noted that the exemplary embodiments described herein also relate to utilizing the turbo decode operation as the decode operation. However, it is again noted the exemplary embodiments may be modified to be used with any decode operation. The second mechanism of the exemplary embodiments may again utilize the combination operation described above with regard to the repetition procedure. As described above, the repetition application 240 may be configured to select which of the repetition operations associated with the repetition procedure to perform where the repetition operations include a first repetition operation (one or more respective data in TTIs corresponding to the control information is combined) and a second repetition operation (one or more respective data in TTIs corresponding to the control information is combined and further performing the decode operation). The selection of the repetition operation may be dynamic based on a confidence level that combined data that has been received will be decoded successfully.

As described above, the memory 210 may store a confidence level threshold value. The confidence level threshold value may define a minimum value in which a confidence level associated with a combined data of TTIs for the second repetition operation to be used. The confidence level may be determined using the LLR combiner functionality. As those skilled in the art will understand, the LLR combiner functionality may include a combining operation in which coded bits from received data is combined. The LLR combiner functionality may perform a logarithmic function of a result of a likelihood ratio test on the coded bits of the combined, received data to determine how likely the combined data matches a particular result (or model) over another result. In this case, the particular result may be a combination of the coded bits that results in the control information to be properly decoded whereas the other results are any permutation of the coded bits that results in the control information to fail in being decoded.

The confidence level threshold value may be determined based on a variety of factors. For exemplary purposes, it may be assumed that the confidence level of the coded bits as output by the LLR combiner functionality may range from 0 to 1 where a confidence level of 1 is a certainty of success and a confidence level of 0 is a certainty of failure. It may also be assumed that a coded bit that is punctured (i.e., a punctured bit) has a confidence level of 0. In a first example of setting the confidence level threshold value, a rigid standard may be used. With a rigid standard, the confidence level threshold value may be set to 1. In such a scenario, the UE 110 may be required to receive a combination of the coded bits that will succeed in decoding the control information as a certainty. In a second example of setting the confidence level threshold value, a looser standard may be used. With a looser standard, the confidence level threshold value may be set to any value greater than 0.5 but less than 1.0. That is, the confidence level threshold value may be set to any value where the probability that the combination of coded bits will be successfully decoded is greater than the probability that the combination of coded bits will fail in being decoded.

In view of the above, a first operation performed by the UE 110 may be to determine the confidence level for the combined data that has been received thus far. As noted above, the confidence application 245 may be configured to perform this operation (e.g., the LLR combiner functionality). Based on the determined confidence level and the confidence level threshold value, the repetition application 240 may determine whether the first or second repetition operation is to be performed by determining whether the determined confidence level satisfies the confidence level threshold value. Specifically, when the determined confidence level is determined to be less than the confidence level threshold value, the repetition application 240 selects the first repetition operation in which only a combination operation is performed. When the determined confidence level is determined to be greater than or equal to the confidence level threshold value, the repetition application 240 selects the second repetition operation in which a combination operation and a subsequent decoding operation is performed. For example, the decoding operation may correspond to a cyclical redundancy check (CRC) to determine whether the combined data from the RVs results in the control information.

Using the above mechanism of selecting the appropriate repetition operation, the repetition application 240 attempts to receive the control information from the eNB 122A. Since no decoding operation is performed until the determined confidence level of the combined data reaches the confidence level threshold value, the repetition application 240 may gather and combine the RVs being received in the TTIs. When the determined confidence level reaches the confidence level threshold value, the repetition application 240 may attempt to decode the combined data. When the decode operation succeeds, the transceiver 225 may be deactivated since the control information has been successfully received. However, when the decode operation fails, the transceiver 225 remains active and the repetition application 240 receives the ensuing RV in the next TTI to again combine and attempt to decode. This process may continue with the second repetition operation until the control information has been decoded with a successful CRC.

The exemplary embodiments enable the repetition procedure used by the eNB 122A to be used by the UE 110 in a more power efficient manner and in a dynamic and adaptive way. Specifically, the UE 110 may assume that RVs received in TTIs that combine with a confidence level less than the confidence level threshold value will not result in a successful decode operation. Thus, the UE 110 may perform only a combining operation and delay any power consuming decode operation (that will likely fail) from being performed. When the RV in a TTI is received and combined with previously received RVs such that the confidence level is at least the confidence level threshold value, the UE 110 may begin to perform the decode operation with a higher probability of success. In this manner, the UE 110 may conserve power by eliminating a need to perform decode operations that will likely fail.

The exemplary embodiments for the second mechanism are described above with regard to the CE using the repetition procedure. However, it is again noted that the CE using the repetition procedure is only exemplary and the second mechanism may also be applied to be used with any transmission procedure in which some form of repetition is used such as the HARQ procedure.

Figure 5:
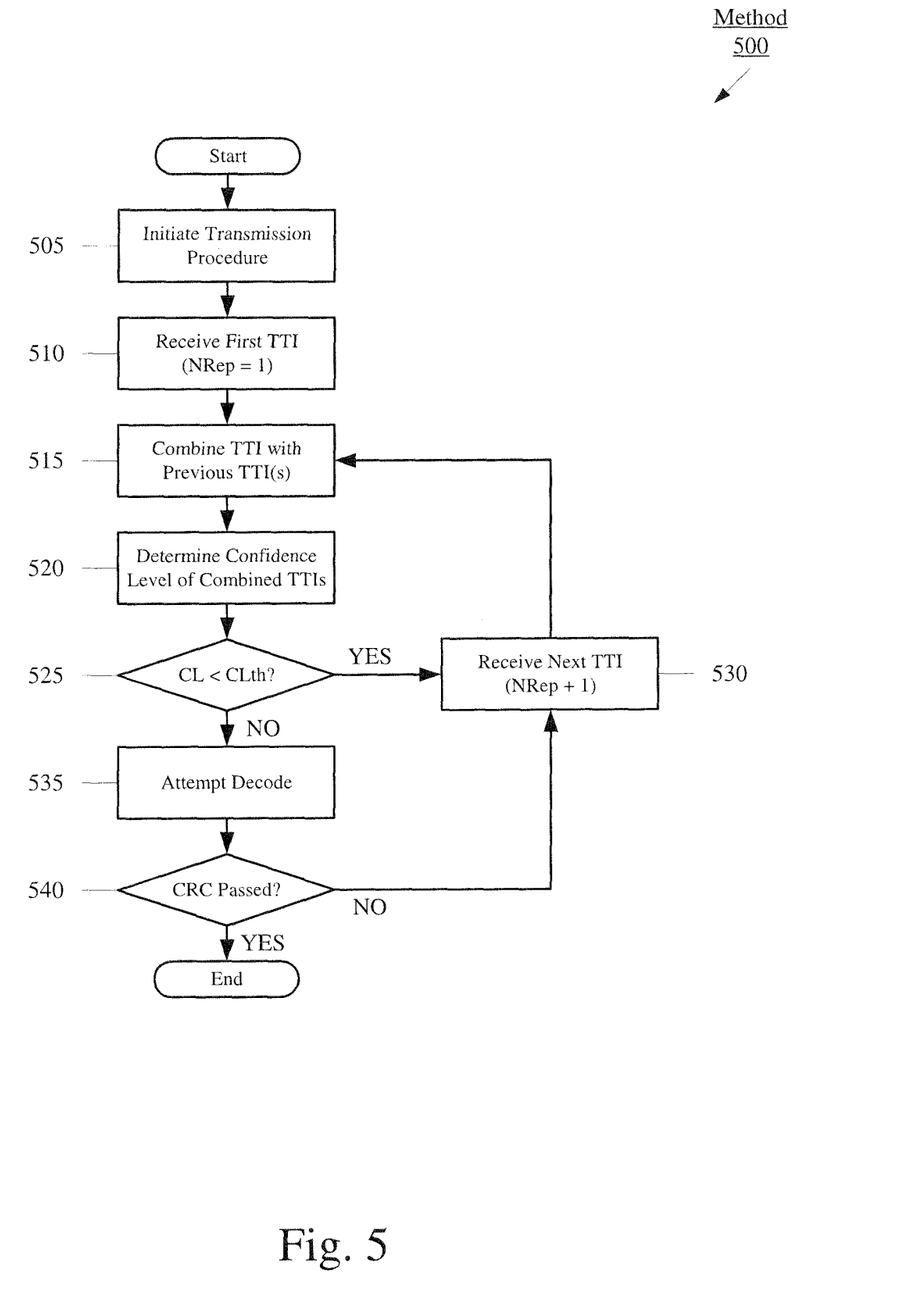
FIG. 5 shows a second method for dynamically utilizing repetition operations according to various exemplary embodiments described herein.

FIG. 5 shows a second method for dynamically utilizing repetition operations according to various exemplary embodiments described herein. As described above, the first mechanism relates to using a measurement of a connection quality. In the second mechanism, a confidence level associated with combined data received from the eNB 122A is compared to a confidence level threshold value that must be passed for the second repetition operation to be performed. The method 500 will be described with regard to the network arrangement 100 of FIG. 1 and the UE 110 of FIG. 2.

The method 500 may incorporate a dynamic evaluation of the confidence level of combined, received data to determine how the repetition operations are to be used. Specifically, the confidence level threshold value to be used during the repetition procedure may be a threshold that a confidence level determined via a LLR combiner functionality must surpass for the second repetition operation to be used. Otherwise, the repetition procedure may dynamically select the first repetition operation to be used until the confidence level from the LLR combiner functionality reaches at least the confidence level threshold value. In this manner, the confidence level threshold value may be a percentage, a ratio, or a value indicating a minimum requirement for the second repetition operation to be used.

In 505, the UE 110 initiates a transmission procedure for control information in a substantially similar manner as 305 of the method 300 described above. In 510, the UE 110 may receive a first RV which indicates that the eNB 122A is utilizing a repetition procedure to transmit the control information. As the first RV in the first TTI, the NRep may be 1. In 515, the UE 110 combines the received TTI with any previously received TTI. Since this iteration relates to the first TTI (NRep=1), the RV in the first TTI represents the entire combination.

In 520, the UE 110 determines a confidence level of the combined data. Again, in this pass of the method 500, the combined data includes only whatever data was received in the first transmission in 510. The confidence level may be determined using the LLR combiner functionality in which a logarithmic function of a result of a likelihood ratio test on the coded bits of the combined data to determine how likely the combined data matches a particular result (or model) over another result is performed. Thus, the UE 110 may determine the confidence level accordingly from the coded bits of the received data.

In 525, the UE 110 determines whether the confidence level from 520 is greater than the confidence level threshold value. As noted above, the confidence level threshold value may be a threshold that the confidence level of the combined data must pass for the second repetition operation to be performed. For example, with the confidence level of the coded bits ranging from 0 to 1 (e.g., where a confidence level of 1 is a certainty of success and a confidence level of 0 is a certainty of failure), a rigid standard may have the confidence level threshold value set to 1 whereas a looser standard may have the confidence level threshold value set to above 0.5 but below 1.0

If the UE 110 determines that the confidence level is less than the confidence level threshold, the UE 110 continues the method 500 to 530. In 530, the UE 110 receives the next TTI (one greater than the current NRep, which in this iteration is NRep+1=2). Subsequently, the method returns to 515. Since no decoding operation is being performed (since the first repetition operation is selected as the confidence level is less than the confidence level threshold value), the UE 110 repeats 515-530 until the confidence level is greater than or equal to the confidence level threshold value.

Returning to 525, when the confidence level is greater than or equal to the confidence level threshold value, the UE 110 continues to 535. In 535, the UE 110 attempts to decode the combined data from all the TTIs to the current moment. In 540, the UE 110 determines whether a CRC (e.g., a decode operation) has passed. If the CRC fails, the UE 110 may receive the next TTI in 530 and then repeat 515-535. That is, the second repetition operation may be used hereafter (assuming the confidence level remains above the confidence level threshold value). However, if the CRC passes, the control information is properly received and the transceiver 225 may be deactivated.

As described above, the second mechanism of the exemplary embodiments may also be modified for use with the HARQ procedure. Thus, the method 500 may be modified accordingly. For example, the combination operation in 515 may be the HARQ combination operation using the LLR combiner functionality. In another example, unlike the repetition operation for CE, the HARQ procedure requires a response from the UE 110 to provide a retransmission if required. Thus, if the CRC fails after 540, the UE 110 may transmit a NACK prior to returning to 530. If the CRC passes after 540, the UE 110 may transmit an ACK.

With at least one retransmission being received of data corresponding to downlink information in the HARQ procedure using the second mechanism, in at least one further pass of the method 500, the UE 110 may combine the coded bits of the received data of the first transmission and the coded bits of the received data in the retransmissions. That is, the features of the HARQ procedure may be used to improve the confidence level of the combined data. For example, under poor connectivity conditions, the data of the first transmission may only include certain coded bits of the downlink information that is insufficient for a successful decoding. However, through retransmissions, the UE 110 may ultimately receive sufficient coded bits through a combination to successfully decode the downlink information. In this manner, until the confidence level threshold value is satisfied, the method 500 may repeat the retransmissions and only combine received data without performing a decode operation. That is, the first repetition operation may be dynamically selected.

By using the HARQ procedure in which received data from the first transmission and subsequent retransmissions include coded bits representing the downlink information, the UE 110 may eventually receive enough of the coded bits for the confidence level of decoding to be successful or greater than the confidence level threshold value.

It should be noted that the above first and second mechanisms of the exemplary embodiments being described separately from one another is only exemplary. The exemplary embodiments may also be modified such that the first and second mechanisms may be combined to further improve upon when the second repetition operation (including the decode operation) is to be used.

The exemplary embodiments provide a device, system, and method of optimizing UE side operations when the eNB of a LTE-RAN utilizes a coverage extension with a repetition procedure. As performing repeated decode operations may inefficiently waste power of the UE, the mechanism according to the exemplary embodiments utilize a first repetition operation in which only a combining operation is performed. The first repetition operation may continue until a predetermined optimum value of TTIs has passed where the optimum value represents a minimal number of TTIs with a highest probability of successfully performing the decode operation. Thus, the mechanism according to the exemplary embodiments utilize a second repetition operation when the TTIs has passed the optimum value such that a decode operation may also be performed. The first repetition operation may also continue until a confidence level associated with decoding the combined, received TTIs surpasses a confidence level threshold value.

Those skilled in the art will understand that the above-described exemplary embodiments may be implemented in any suitable software or hardware configuration or combination thereof. An exemplary hardware platform for implementing the exemplary embodiments may include, for example, an Intel x86 based platform with compatible operating system, a Windows OS, a Mac platform and MAC OS, a mobile device having an operating system such as iOS, Android, etc. In a further example, the exemplary embodiments of the above described method may be embodied as a program containing lines of code stored on a non-transitory computer readable storage medium that, when compiled, may be executed on a processor or microprocessor.

It will be apparent to those skilled in the art that various modifications may be made in the present disclosure, without departing from the spirit or the scope of the disclosure. Thus, it is intended that the present disclosure cover modifications and variations of this disclosure provided they come within the scope of the appended claims and their equivalent.

What is claimed is:

1. A method, comprising:
   at a user equipment:
   receiving a redundancy version (RV) of control information during a transmission time interval (TTI) from a network to which the user equipment has established a connection, wherein the control information comprises a plurality of RVs;
   determining a first value corresponding to the TTI;
   determining a second value based on a connectivity parameter measurement of the connection; and
   determining whether to perform a decode operation on the RV based on a comparison of the first value and the second value.

2. The method of claim 1, wherein the first and second values correspond to a number of TTIs in which the control information is received.

3. The method of claim 1, further comprising:
   combining the RV with at least one further RV received in previous TTIs to generate combination data, wherein the decode operation is performed on the combination data.

4. The method of claim 1, wherein, when it is determined that the decode operation is not to be performed, the method further comprises:
   receiving a further RV of the control information during a subsequent TTI;
   combining the RV and the further RV to generate combination data;
   determining a third value corresponding to the subsequent TTI;
   determining a fourth value based on a further connectivity parameter measurement of the connection; and
   determining whether to perform a decode operation on the combination data based on a comparison of the third value and the fourth value.

5. The method of claim 1, wherein, when the decode operation is performed, the method further comprising:
   determining whether the decode operation is successful;
   when the decode operation is not successful, receiving a further RV of the control information during a subsequent TTI; and
   combining the RV and the further RV to generate combination data.

6. The method of claim 1, wherein the RV is associated with a hybrid automatic repeat request (HARQ) procedure.

7. The method of claim 6, further comprising:
   when the first value is less than the second value, transmitting a negative acknowledgement (NACK) to the network;
   when the first value is greater than or equal to the second value and the decode operation fails, transmitting a negative acknowledgement (NACK) to the network; and
   when the first value is greater than or equal to the second value and the decode operation succeeds, transmitting an acknowledgement (ACK) to the network.

8. The method of claim 1, wherein, when the decode operation is successful, the method further comprising:
   determining a difference value between the first value and the second value; and
   adjusting the second value based on the difference value.

9. The method of claim 8, wherein the adjusting the second value comprises:
   when the difference value is less than a down threshold, decreasing the second value; and
   when the difference value is greater than an up threshold, increasing the second value.

10. The method of claim 1, wherein the connectivity parameter measurement comprises one of a downlink signal to noise ratio (SNR), a block error rate (BLER), a Doppler value or a power headroom value.

11. The method of claim 1, wherein the decode operation comprises a turbo decode operation.

12. A user equipment, comprising:
    a processor configured to:
    receive a redundancy version (RV) of control information during a transmission time interval (TTI) from a network to which the user equipment has established a connection, wherein the control information comprises a plurality of RVs;
    determine a first value corresponding to the TTI;
    determine a second value based on a connectivity parameter measurement of the connection; and
    determine whether to perform a decode operation on the RV based on a comparison of the first value and the second value.

13. The user equipment of claim 12, further comprising:
    a transceiver configured to establish the connection to the network, wherein, prior to receiving all of the plurality of RVs for the control information, the transceiver is temporarily deactivated when the decode operation is successful.

14. The user equipment of claim 12, further comprising:
    a memory configured to store the second value corresponding to the connectivity parameter measurement.

15. The user equipment of claim 14, wherein the memory stores a plurality of second values corresponding to measured values of the connectivity parameter measurement.

16. A method, comprising:
    at a user equipment:
    receiving a redundancy version (RV) of control information from a network to which the user equipment has established a connection, wherein the control information comprises a plurality of RVs;
    determining a confidence level of successfully performing a decode operation on the RV;
    determining whether the confidence level is less than a threshold value; and
    when the confidence level is greater than or equal to the threshold value, performing the decode operation on the RV.

17. The method of claim 16, further comprising:
    when the confidence level is less than the threshold value, receiving a further RV of the control information;
    combining the RV and the further RV to generate combination data;
    determining a second confidence level of successfully performing the decode operation on the combination data; and
    when the second confidence level is greater than or equal to the threshold value, performing the decode operation on the combination data.

18. The method of claim 16, wherein determining the confidence level comprises performing a log likelihood ratio (LLR) combiner functionality.

19. The method of claim 16, further comprising:
    when the decode operation is successful, deactivating a transceiver of the user equipment prior to receiving all of the plurality of RVs.

20. The method of claim 16, further comprising:
when the decode operation is not successful, receiving a further RV of the control information;
combining the RV and the further RV to generate combination data;
determining a second confidence level of successfully performing the decode operation on the combination data; and
when the second confidence level is greater than or equal to the threshold value, performing the decode operation on the combination data.

* * * * *